United States Patent Office 3,778,383
Patented Dec. 11, 1973

3,778,383
PROCESS FOR THE ENCAPSULATION OF SUBSTANCES WHICH ARE FINELY DISTRIBUTED IN A LIQUID, AND CAPSULE COMPOSITIONS PRODUCED THEREBY
Luzius Schibler, Riehen, and Melvin Harris, Arlesheim, Switzerland, assignors to Ciba-Geigy AG, Basel, Switzerland
No Drawing. Continuation-in-part of abandoned application Ser. No. 145,030, May 19, 1971. This application Nov. 11, 1971, Ser. No. 197,946
Claims priority, application Switzerland, May 26, 1970, 7,813/70; May 6, 1971, 6,696/71
Int. Cl. B01j 13/02; B44d 1/02, 1/14
U.S. Cl. 252—316
15 Claims

ABSTRACT OF THE DISCLOSURE

An encapsulation process is provided wherein the substances to be encapsulated are dispersed in a distribution medium in the presence of a reactive tenside which is capable to form a compound insoluble in the distribution medium. The dispersed reactive tenside is converted to the irreversible, insoluble state forming a primary capsule suspension and then mixed with an aminoplast precondensate solution to form a secondary suspension of capsules having strengthened walls.

The reactive tenside and the aminoplast precondensate also may be added together and converted to the irreversibly insoluble state at the same time.

The capsules are useful to encapsulate most diverse active substances, such as solvents, dyestuffs, pigments or pesticides.

CROSS-REFERENCE

This invention is a continuation-in-part of applicant's copending application Ser. No. 145,030, filed May 19, 1971, and now abandoned, the disclosure of which is relied on and incorporated by reference in this application.

The subject of the invention is a process for the encapsulation of substances which are finely distributed, by means of tensides, in a liquid, characterised in that (1) the substance to be encapsulated is dispersed in a distribution medium in the presence of a reactive tenside capable of forming a compound insoluble in the distribution medium,
(2) the tenside in the dispersion thus obtained is converted to the irreversible, insoluble state, with the formation of a primary capsule suspension,
(3) this suspension is mixed with a solution of aminoplast precondensates of low surface activity, and
(4) these aminoplast precondensates in the suspension are converted to the irreversibly insoluble state, with the formation of a secondary suspension of capsules having strengthened walls.

By the term tensides are generally understood substances soluble in water or in organic solvents, which lower the surface tension of the solvent and therefore act as emulsifiers or dispersing agents. Tenside molecules possess both hydrophobic and hydrophilic groups and have the property that they accumulate at the phase boundaries (for example oil-water). When shaken with the solvent, they form voluminous and stable foams. In dilute solution these compounds are able to lower considerably the surface tension of the solvent. Under certain conditions, preferably in the case of an acid reaction or at fairly high temperature, reactive tensides are also able to cross-link, whereupon insoluble, resinous condensates are formed which no longer possess any tenside properties. Particularly reactive tensides of this type are derived from aminoplasts, preferably ureaformaldehyde or melamine-formaldehyde compounds, which are substituted both by hydrophobic and by hydrophilic groups. Reactive tensides of this type which are employed according to the invention are known, for example from French patent specifications 1,065,686, 1,381,811, 1,470,103 and 1,581,989.

The reactive tensides of the type mentioned are particularly suitable for the manufacture of finely dispersed systems, by which are meant emulsions and dispersions the particle diameter of which is generally on averabe $1\mu$, preferably even less than $1\mu$. If suitably diluted, such dispersions pass through customary filters without leaving any residue, and in some cases even through hardened filters. Even substances which can be dispersed only with difficulty, such as for example viscous adhesive solutions, can be brought into a very fine state of distribution in appropriate apparatus by means of such tensides.

The general property of tensides of accumulating at the phase boundaries, and the particular ability of reactive tensides to crosslink, especially in an acid environment, make the latter tensides suitable for the encapsulation technique. A process wherein finely distributed substances are encapsulated by means of reactive tensides is known from French patent specification 1,487,905.

For certain end uses, this process has the disadvantage that the capsule walls are not very strong, that is to say they can be relatively easily punctured or mechanically damaged.

It is also known that water-insoluble, solid or liquid substances can be encapsulated, that is to say surrounded with a coating of resin, by dispersing the substances by means of a fast-running stirrer in a solution of a primary condensate prepared in the customary manner from, for example, urea and formaldehyde, acidifying the mixture and, while the resin forms, continuing to stir without interruption so that the dispersed particles are permanently kept in a state of distribution, or particles which have fused or conglomerated are separated from one another again. For several reasons, this known method of working gives unsatisfactory results. Firstly, the solution of a primary condensate prepared in this known way has only a slight dispersion effect, with the result that only relatively coarse particles of at least several $\mu$ in diameter can be manufactured. However, in very many cases it is desired to make the capsules as small as possible since, in this case, their contents can better and more uniformly come into effect. In this connection it should be noted that merely doubling the diameter, say, from $1\mu$ to $2\mu$ produces capsules having eight times the volume; in other words, a capsule of $2\mu$ diameter corresponds to eight capsules of $1\mu$ diameter. The distribution of the active substance is thus eight times better in the case of the small capsules.

Secondly, the intense stirring required to maintain the distribution of the particles interferes with the formation of a uniform and dense shell, so that only incomplete encapsulation (for example in the case of organic solvents of low specific gravity) is achieved. It is therefore difficult, and for many purposes even impossible, to manufacture capsules of sufficient denseness and strength.

Thirdly, substances which can be dispersed only with relative difficulty, such as, for example, viscous adhesive substances, cannot be distributed at all in the customary primary condensate solutions. If attempts are made to force the dispersion of such substances by adding emulsifiers of the customary type, it is found that subsequently encapsulation is no longer possible since the emulsifier occupies the surface of the particles.

All these disadvantages of the known encapsulation processes are now largely obviated by the process according to the invention, in which it has surprisingly been found that a combination of the known processes, which are in themselves unsatisfactory to some extent, leads to a new process which gives unexpected and advantageous results.

The process according to the invention is advantageously carried out by first of all forming a primary emulsion or dispersion, curing this, that is to say converting the reactive tenside used for the dispersion to an insoluble resin, and finally forming a second resin layer on the relatively thin-walled capsules thus formed, or strengthening the skin which is first of all formed, by adding a solution of a customary aminoplast precondensate to the capsule dispersion formed and polycondensing this also. Whereas the formation of the original emulsion or dispersion requires a powerful means of stirring, the actual encapsulation, that is to say the curing of the reactive tenside and the formation of the subsequent second layer, can be carried out practically without any stirring since the particles formed are so small that they are subject to Brownian motion and thus the homogeneity of the suspension is ensured even without stirring. This is especially the case of the specific gravity of the encapsulated substance is not very different from that of the surrounding solvent.

A further mode to work the present invention is to delete step two converting the reactive tenside and the aminoplast precondensate to the insoluble state at the same time.

Another subject of the invention is thus a process for the encapsulation of a substance which is finely divided in a liquid by means of surface-active agents, characterised in that (1) the substance to be encapsulated is dispersed in a distribution medium in the presence of a reactive surface-active agent which can form a compound which is insoluble in the distribution medium, (2) this suspension is mixed with a solution of aminoplast precondensates of low surface activity or with the mixtures from which these are formed and (3) the reactive surface-active agents and aminoplast precondensates are converted to the irreversibly insoluble state, with a suspension of capsules being formed.

Accordingly, an appropriate procedure is first to manufacture a primary emulsion or dispersion, to add the solution of a customary aminoplast precondensate to this dispersion and to polycondense the reactive surface-active agent simultaneously with the aminoplast precondensate. Whilst the formation of the original emulsion or dispersion requires a strong stirring, the actual encapsulation, that is to say the curing of the reactive surface-active agent and of the aminoplast precondensate can be carried out practically without stirring.

The reactive tensides employed according to the invention are preferably strongly surface-active aminoplast precondensates.

Particularly suitable reactive tensides are aminoplast precondensates containing methylol groups, which contain (a) radicals of monohydroxy compounds containing at least 4 carbon atoms, and
(b₁) radicals of an amine containing hydroxyl groups, or
(b₂) radicals of a polyethylene glycol, or
(b₃) radicals of an alcohol containing at least two hydroxyl groups and radicals of Me-O₃S groups joined to carbon atoms, Me denoating an alkali metal atom, or
(b₄) radicals of aliphatic hydroxycarboxylic acids which are joined via the hydroxyl group to the aminoplast precondensate, and optionally an amine containing hydroxyl groups.

By the term aminoplast precondensates, from which these reactive tensides are derived, are understood addition products of formaldehyde and nitrogen compounds which can be methylolated. So-called aminoplast-forming compounds which may be mentioned here are: 1,3,5-aminotriazines, such as N-substituted melamines, for example N-butylmelamine, N-trihalogenomethylmelamines, and am- meline, guanamines, for example benzoguanamine, acetoguanamine or diguanamines. Further suitable compounds are alkyl- or aryl-ureas and -thioureas, alkylene-ureas or -diureas, for example ethylene-urea, propylene-urea, acetylene-diurea or 4,5-dihydroxyimidazolidone-2 and derivatives thereof, for example 4,5-dihydroxyimidazolidone-2 substituted in the 4-position on the hydroxyl group by the radical —CH₂CH₂CO—NH—CH₂—OH. The methylol compounds of urea and melamine are preferably employed. Products which are methylolated as highly as possible in general yield particularly valuable products. Suitable starting products are both the predominantly monomolecular compounds and the more highly precondensed compounds. The aminoplast precondensates employed as starting products for the manufacture of the reactive tensides can also be employed as ethers of alkanols with 1 to 3 carbon atoms, especially as methyl ethers.

Strongly surface-active, etherified methylol-melamines or methylol-ureas are accordingly preferably employed as reactive tensides.

Non-ionic, anionic and cationic tensides are included in the plurality of reactive tensides which are suitable for the process according to the invention.

Particularly suitable non-ionic reactive tensides are, for example, curable, aminoplast precondensates containing etherified with a monoalcohol having 4 to 7 carbon atoms. partially etherified with hydroxy compounds of the formula (1) $\quad$ HO—(CH₂—CH₂—O—)$_n$—H wherein $n$ denotes an integer from 2 to 115, and partially etherified with a monoalcohol having 4 to 7 carbon atoms. Compounds of the Formula 1 are preferably polyethylene glycols. Monoalcohols are, for example, amyl alcohols, hexanol-(1), 2-ethylbutanoyl-(1), dodecanol, benzyl alcohol, stearyl alcohol or, above, all, n-butanol.

Curable ethers of methylol-ureas or methylol-melamines whose methylol groups are partially etherified with a polyethylene glycol of average molecular weight 1000 to 5000, and partially etherified with an alkanol having 4 to 7 carbon atoms, are of particular interest as reactive tensides. Reactive tensides of this type are described in French patent specification 1,381,811.

Reactive tensides with anionic character which are employed are, for example, aminoplast precondensates containing etherified methylol groups, which methylol groups are partially reacted with monohydroxy compounds containing at least 4 carbon atoms and partially with alcohols containing at least two hydroxyl groups, and which contain Me—O₃S— groups joined to carbon atoms, wherein Me denotes an alkali metal atom. Me may thus, for example, be a sodium, potassium or lithium atom. Particularly suitable tensides of this type are, above all, etherified methylol-ureas or methylol-melamines whose methylol groups are partially etherified with alkanols which contain 4 to 18 carbon atoms and partially with alcohols of the formula H—(O—CH₂—CH₂)$_m$—OH, where $m$ represents an integer which is at most equal to 25, and which contain Me—O₃S— groups, wherein Me denotes an alkali metal atom, joined to carbon atoms. Such anionic reactive tensides are described in French patent specification 1,470,103.

Other interesting reactive tensides with anionic character are, for example aminoplast precondensates containing etherified methylol groups, which methylol groups are partially etherified with monohydroxy compounds which contain 4 to 22 carbon atoms, partially with aliphatic hydroxycarboxylic acids which possess 2 to 4 carbon atoms, and optionally partially with an alkanolamine which possesses 2 to 6 carbon atoms. Of these reactive tensides, etherified methylol-ureas or methylolmelamines are in particular preferred, whose methylol groups are partially etherified with alkanols which contain 4 to 22 carbon atoms, partially with saturated hydroxyalkanecarboxylic acids which possess 2 to 4 carbon atoms, and optionally partially with ethanolamine, diethanolamine or triethanolamine. Such anionic reactive tensides are described in French patent specification 1,581,989.

Aminoplast precondensates whose methylol groups are partially reacted with an alkanol or a fatty acid, which contain, in each case, at least 4 carbon atoms, and partially with an alkanolamine which possesses 2 to 6 carbon atoms, are preferably employed as so-called cationic reactive tensides. Particularly suitable representatives of tensides of this type are methylol-melamines whose methylol groups are partially etherified with an alkanol which possesses 4 to 22 carbon atoms, and partially with ethanolamine, diethanolamine or triethanolamine. Cationic reactive tensides of this type are described in French patent specification 1,065,686.

The manufacture of the primary capsule emulsion is now performed using one of the reactive tensides of the type indicated, according to the process described in French patent specification 1,487,905.

The same amnioplast-forming compounds as are indicated for the reactive tensides can be used as starting substances for the manufacture of the aminoplast precondensates of low surface activity. However, an unetherified methylol-melamine or methylol-melamine etherified with alcohols containing at most 3 carbon atoms, and/or a corresponding methylol-urea, is preferably employed as the aminoplast precondensate. Above all, di- to hexamethylol-melamines are of particular interest. In contrast to the reactive tensides, the aminoplast precondensates of low surface activity form practically no stable foams on mixing and shaking together with a solvent. Also, as a rule such aminoplast precondensates in dilute solution have only a slight influence on the surface tension of the solvent.

The manufacture of such aminoplast precondensates is known and is for example carried out, if the process is performed in an aqueous medium, by dissolving 1 mol of urea or malamine in such an amount of an aqueous, approximately 37% strength formaldehyde solution that about 1.2 to 2 mols of formaldehyde are available per 1 mol of urea, and about 3 to 6 mols of formaldehyde are available per 1 mol of melamine. The solutions formed are diluted to some extent with water, if necessary, and are precondensed for some time at a pH value of above 8.0 and at slightly elevated temperature. In the case of the two-step process the aminoplast precondensate solutions obtained in this way are added to the previously prepared primary capsule suspensions, and at the same time care should be taken that the dispersibility of the suspension is maintained. Each individual capsule must be able to move freely, and this is guaranteed by adding a sufficient amount of water. In the case of the one-step process the aminoplast precondensate solutions are added to the dispersions or emulsions of the substance to be encapsulated and the reactive tenside. The final resin coating in both cases forms over the course of a few hours at a pH value of about 2.0 in the case of ureaformaldehyde, and about 4.0 in the case of melamineformaldehyde. During this time, stirring is generally not necessary, but the resin formation can be accelerated by raising the temperature to 40 to 60° C.

When the encapsulation is complete, the pH value can be adjusted to any desired value by adding a base, for example ammonia or an alkali hydroxide. The resulting capsule compositions or suspensions contain agglomerations formed by the coalescing of small caspules having diameters of mostly less than $1\mu$. Depending on the amount of the aminoplast precondensate of low surface activity which is added, capsules of differing wall thicknesses, differing denseness, and differing mechanical destructibility are obtained.

The amounts of reactive tenside, aminoplast precondensate and substance to be encapsulated may vary widely, depending on the end use of the capsules and on the type of substance to be encapsulated. For encapsulating liquid substances it has proved advantageous to employ 5 to 50 parts by weight of reactive tenside and 10 to 50 parts by weight of aminoplast precondensate per 100 parts by weight of liquid. In the case of solid substances to be encapsulated, the lower limits of these amounts which are used are as a rule somewhat higher, that is to say, for example, 30 to 50 parts by weight of reactive tenside and 30 to 50 parts by weight of aminoplast precondensate are employed per 100 parts by weight of solid substance. The parts by weight in the case of the reactive tensides and the aminoplast precondensates here refer, of course, to the dry product.

In the process according to the invention, the conversion of the reactive tensides or of the aminoplast precondensates of low surface activity to the irreversibly insoluble state can be initiated and completed by various measures. Measures which may in particular be mentioned are raising the temperature, adjusting the mixture to a certain pH value, adding substances which react with the tensides or aminoplast precondensates to form high molecular weight products and, above all, adding so-called curing catalysts which give an acid reaction.

If encapsulation is to be carried out in an aqueous medium, the pH value of the preparation is advantageously 2 to 5. Aliphatic, low molecular weight carboxylic acids are above all suitable for adjusting the pH value, such as formic acid, acetic acid or citric acid, as are inorganic acids, such as hydrochloric or phosphoric acid, and also acid salts or hydrolysable salts, such as aluminum sulphate, titanium oxychloride, magnesium chloride, and ammonium salts of strong acids, such as ammonium chloride, nitrate, sulphate or dihydrogen phosphate. Oxidising agents which can oxidise formaldehyde to formic acid, such as hydrogen peroxide, are also suitable. However, the use of acids has been found to be most suitable.

As mentioned previously, water is preferably employed as the distribution medium, and a substance which is insoluble in water and does not react with water is employed as the finely distributed substance. Conversely, it is entirely possible to employ organic solvents which are immiscible with water as the distribution medium, and to employ water-soluble substances or aqueous solutions thereof as the finely distributed substance.

Aliphatic and aromatic hydrocarbons and halogenated hydrocarbons, such as benzene, toluene, chlorobenzene, tetra- and decahydronaphthalene, trichloroethylene or carbon tetrachloride may be mentioned as examples of such distribution media.

The proportion of encapsulated substance, relative to the total capsule composition, can vary to a great extent. It can be only 20 percent by weight, or can be up to 99 percent by weight. However, it is preferably 70 to 95 percent by weight. Depending on the end use, the walls of the capsules can be strengthened to a greater or lesser degree. The walls can thus be made hard or flexible. The degree of porosity of the capsule walls can also be adjusted as desired.

If it is desired to use the finished capsules as such, they can be freed from adherent liquid by filtration and/or drying (for example also spray drying). The dry capsules form a fine, free-flowing powder. Furthermore, they can be used as a suspension in a liquid, as shaped articles, pressed into tablets, as a coating on a surface, or in any other way in which the capsules initially remain as such.

The capsules can be kept for a very long time. Even temperatures of about 100° C. do not have any destructive effect on the quality of the capsules, as long as no heat-sensitive substances have been encapsulated.

The encapsulated, finely distributed substance can be liberated from the capsules in various ways. As a rule this is carried out mechanically by breaking the capsule wall by applying pressure to the wall. Furthermore, the substance can also be liberated, above all if it is not liquid, by dissolving the capsule wall with an appropriate solvent, by shear forces, abrasion, heat, ultrasonics, enzymes, or by slow diffusion through a partially intact capsule wall.

Substances which may be finely distributed according to the process of the invention are solid, liquid or gaseous substances.

Solids must be dispersed in the presence of the reactive tenside and if necessary must be comminuted sufficiently by grinding to form a stable dispersion.

If the substance to be encapsulated, that is to say the inner phase, is liquid, it may be insoluble in the distribution medium, that is to say in the outer phase, or at least immiscible with this outer phase. In general it may be said that the outer and inner phases should be so chosen that neither substantial amounts of the one phase are dissolved by the other phase, nor undesired chemical reactions occur. The most diverse active substances, such as pigments, fillers, pesticides, perfumes, fats, waxes, paraffin, fertilisers or pharmaceuticals can be used as dispersed solids Undiluted liquid active substances, such as, for example, paraffin oil or solutions of liquid or solid active substances in appropriate solvents are suitable as liquid substances to be emulsified. In general liquid substances which have a high boiling point, or are of low volatility, are preferred. Examples which may be mentioned here are phthalic acid dibutyl ester and phosphoric acid tricresyl ester, and chlorinated diphenyl. Furthermore, other water-insoluble solvents which are more volatile, such as, for example, petroleum toluent or xylene, are suitable. Organic solvents which are sparingly soluble in water can thus be employed in two different ways in the present process, firstly as a distribution medium for an aqueous inner phase (water-in-oil emulsion), and secondly as the inner phase, where they contain, in general, at least one further substance, for example, a fat dyestuff, a colour-forming compound or an adhesive, in solution (oil-in-water emulsion). Equally, water or aqueous solutions may be suitable as the outer or as the inner phase. Salts, dyestuffs or adhesives can, for example, be dissolved in an inner aqueous phase. It may also be the case as, say, with fats, waxes or paraffins, that the inner phase formed by these substances is initially fluid, as a result of the high working temperature, so that an emulsion is present, and then changes to the solid state on cooling. In a similar manner, substances dissolved can crystallise out within the capsules from aqueous solutions which are emulsified in a non-aqueous outer phase, in the course of the process or subsequently.

The capsules manufactured according to the process of the invention are in particular suitable for the manufacture of pressure-sensitive copying papers. In this case, dyestuff precursors, optionally together with anti-oxidants or UV-absorbers, are encapsulated and applied to the paper or worked into the paper composition. The dyestuff precursors which as a rule are encapsulated as an organic solution can, for example, be applied to the rear face of a paper. The capsules are burst by pressure and the dyestuff precursor solution is transferred image-wise to the surface of a paper below, the paper being coated with a developer.

The developer can also be present in the paper composition of the receiver sheet. This process is also called the "chemical transfer" process.

In the so-called "chemical self-contained" process the encapsulated dyestuff precursor and the developer are applied in one or more layers to the paper, so that the surface of each sheet is permanently active. In the case of so-called "monoform" papers the capsules and the developer are together incorporated into the paper composition.

Kaolins having an acid reaction are, for example, used as developers.

Such papers coated with the capsules manufactured according to the invention are distinguished by excellent shelf life. After a storage of over 10 hours at 100° C., copies of unchanged good quality, having sharp, non-smudged script edges are obtained.

In the manufacturing instructions and examples which follow, parts and percentages are by weight.

Manufacturing instructions for reactive tensides (I) 206 parts of 36.5% strength aqueous formaldehyde, 170 parts of n-butanol and 60 parts of urea are mixed with 8 parts of 25% strength ammonia, and heated in a stirred flask with a descending condenser at 96° C. for 2 hours, a total of 32 parts of a mixture of n-butanol and water being distilled off. The mixture is now cooled to about 50° C. and 1 part of 85% strength phosphoric acid, dissolved in 20 parts of n-butanol, is added. The mixture is heated in vacuo at 80° C., whereupon water and n-butanol distil off. The water is separated from the distillate, whereas the n-butanol runs back into the reaction vessel. After 4 hours the product is practically anhydrous and is miscible with benzene in any proportion. The product is now neutralised by adding 5 parts of triethanolamine and is evaporated in vacuo to 212 parts, whereupon a product is obtained which is referred to as lacquer resin A in the following text.

212 parts of the urea-formaldehyde-butanol lacquer resin A (corresponding to 1 mol of urea) are heated with 177 parts of polyethylene glycol of average molecular weight 1540 at 120 to 130° C. until the product gives a clear solution in water. During this time, about 24 parts of butanol distil off. 35 parts of triethanolamine are now added, and the mixture is heated further for 1 hour at 120° C. The resulting condensation product is mixed with such an amount of distilled water that a 50% strength, pale yellowish, clear solution is formed, which can be diluted further with water as desired. The product proves to be an excellent emulsifier in alkaline (pH= 9.0) or weakly acid solution (pH=5.0), and is cross-linked by strong acids, especially at a fairly high temperature. Approximately 6 parts of insoluble resin are formed from 100 parts of 50% strength tenside solution.

(II) 390 parts of hexamethylol-melamine hexamethyl ether, corresponding to 1 mol of melamine, are heated with 372 parts (2 mols) of dodecanol and 1540 parts (1 mol) of polyethylene glycol having an average molecular weight of 1540, in the presence of 3.35 parts of 85% strength phosphoric acid, for 1 hour at 115 to 130° C., whereupon 97 parts of methanol distil off. The reduction product is neutralised with 10 parts of triethanolamine. A waxy tenside which is easily soluble in water is obtained. Its aqueous solutions foam and have an excellent emulsifying and dispersing effect.

(III) 212 parts of the urea-formaldehyde-butanol lacquer resin A (corresponding to 1 mol of urea) described in instruction I are heated with 70 parts of glycollic acid butyl ester and 4 parts of glacial acetic acid in vacuo at 85 to 90° C. until 42 parts of n-butanol have distilled off. The mixture is then further stirred for one hour at 100° C. under reflux. Finally, the reaction product is diluted with 140 parts of ethanol, 35 parts of solid potassium hydroxide are added, and the mixture is heated for 15 minutes under reflux, whereby the ester groups are saponified. After evaporation in vacuo, 225 parts of a solid, pale brownish substance which dissolves easily in water are obtained. If some acid is added to the strongly foaming solution, a cross-linked product which is insoluble in caustic alkali solution precipitates.

(IV) 126 parts of melamine are dissolved at 60° C., with the addition of 18 parts of 25% strength ammonia, in 590 parts of 36.5% strength aqueous formaldehyde containing methylol. The solution is warmed to 80° C. and 132 parts of a mixture of methanol and water distils off in vacuo over the course of about 20 minutes. 490 parts of n-butanol are now added and the mixture is distilled further in vacuo, and the water-n-butanol mixture which passes over is separated. The n-butanol returns to the reaction vessel, whilst 118 parts of aqueous layer separate out. 3 parts of 85% strength formic acid, dissolved in 5 parts of n-butanol, are added and a total of 452 parts of n-butanol are now distilled off, which entrain the last remaining amounts of water. 532 parts of a viscous, colourless resin are obtained, which is miscible in any desired proportion with benzene, and is designated as lacquer resin B in the following text.

532 parts of the melamine-n-butanol lacquer resin B (containing 1 mol of melamine) are heated with 104 parts of triethanolamine, whilst stirring, for 1½ hours at 120° C. and then for 1½ hours at 135 to 140° C., whereupon 76 parts of n-butanol distil off. After cooling, 560 parts of a clear, viscous product, which dissolves easily in 10% strength acetic acid are obtained. The acid solutions of the product possess an excellent emulsifying ability. The formation of an insoluble resin occurs at a pH value of 4.0 and slightly elevated temperature. These properties characterise the product as a reactive tenside. The product has a solids content of 80 to 85%. In a 5% strength aqueous solution, this reactive tenside lowers the surface tension of water from 72.75 dynes/cm. to 37.6 dynes/cm.

(V) 445 parts of the laquer resin B from instruction IV are mixed with 50 parts of a polyethylene glycol having an average molecular weight of 4000. The mixture is warmed to 95 to 100° C., and 3 parts of glacial acetic acid are added. The mixture is further heated at 95 to 100° C. until a sample of the reaction product dissolves in water to give a clear solution. 70 parts of triethanolamine are now added, and the mixture is stirred and warmed for a further 2 hours at 120° C. After cooling, a colourless, waxy substance which is easily miscible with water at 60° C. is obtained. On adding an equal amount of water and some acetic acid, a 50% strength, slightly turbid tenside solution having a pH value of 8.1 to 8.2 is obtained. In a 5% strength aqueous solution this reactive tenside lowers the surface tension of water from 72.75 dynes/cm. to 41.0 dynes/cm.

EXAMPLE 1

(1.1) Manufacture of the primary emulsion 20.0 g. of reactive tenside according to instruction IV are dissolved in a mixture of 98.0 g. of water and 2.0 g. of glacial acetic acid. 200.0 g. of dyestuff solution, consisting of 3.6 g. of crystal violet-lactone, 2.4 g. of benzoyl-leucomethylene blue in 97.0 g. of chlorinated diphenyl and 97.0 g. of paraffin oil are now emulsified with the reactive tenside solution, using a fast stirrer. The emulsion is adjusted to a pH value of 2.1 with 400 ml. of water and 6 ml. of 85% strength phosphoric acid. The particle size of this emulsion is about 1μ.

(1.2) Curing of the primary emulsion

The primary emulsion is allowed to stand for 3 hours at room temperature and for 2 hours at 60° C. The pH value is now adjusted to 6.0 with 24% strength ammonia.

(1.3) Manufacture of the secondary suspension 50.0 g. of the primary capsule suspension (from 1.2) are diluted with 30 ml. of water and are mixed, whilst stirring, with a solution of 10 ml. of water and 7.0 g. of an aminoplast precondensate prepared by stirring 2.38 g. of melamine and 4.62 g. of 37% strength formaldehyde for 30 minutes at 60° C. In a 5% strength aqueous solution, this aminoplast precondensate lowers the surface tension of water from 72.75 dynes/cm. to 57.5 dynes/cm. The foam volume of such a solution after shaking for one minute is practically nil. The suspension is mixed for 30 minutes at room temperature.

(1.4) Strengthening the primary capsules 0.5 ml. of 85% strength phosphoric acid is added, the temperature is raised to 40° C., and the mixture is stirred for 30 minutes at this temperature. The mixture is now stirred for a further hour at 60° C. and is then cooled to 20° C. The suspension is adjusted to a pH value of 9.0 by means of 24% strength ammonia. The particle size of the capsules is still about 1μ.

A very fine powder is obtained on drying the capsule composition. This powder can be dispersed again in water and coated onto paper. The quality of the capsules remains practically unaltered even after more than 300 hours' storage at 100° C., and the capsules can be used for the manufacture of copying papers.

In addition to the aminoplast precondensates described in (1.3), aminoplast precondensates of the following composition can also be successfully used, under the same conditions.

| | Melamine in g. | Formaldehyde(37% strength) in g. | Molar ratio of melamine: formaldehyde |
|---|---|---|---|
| (a) | 1.95 | 5.05 | 1:4 |
| (b) | 1.655 | 5.345 | 1:5 |
| (c) | 1.435 | 5.565 | 1:6 |

Instead of the reactive tenside according to instruction IV, a reactive tenside according to one of the instructions I to III, or V, can also be used equally successfully.

EXAMPLE 2

100.0 g. of primary capsule suspension according to (1.2) are diluted with 55 ml. of water and a solution of 20 ml. of water and 18.0 g. of aminoplast precondensate is added, whilst stirring. The suspension is warmed to 240° C., acidified with 0.9 ml. of 85% strength phosphoric acid, and stirred for 30 minutes at this temperature. The suspension is now stirred for one hour at 65° C. and is then cooled to 20° C. The suspension is adjusted to a pH value of 9.0 with 24% strength ammonia. The particle size of the capsules is about 1μ. These capsules are also gas-tight, and can be isolated as a powder.

The aminoplast precondensate is manufactured from the following components:

(a) 1.23 g. of melamine, 2.85 g. of urea, 13.95 g. of formaldehyde solution (37%) or
(b) 0.67 g. of melamine, 3.17 g. of urea, 14.16 g. of formaldehyde solution (37%)

The individual components are stirred together for 30 minutes at 60° C.

EXAMPLE 3

75.0 g. of primary capsule suspension according to (1.2) are diluted with 45 ml. of water and a solution of 15 ml. of water and 14.0 g. of aminoplast precondensate is added, whilst stirring. The suspension is stirred for 15 minutes at room temperature. 0.7 ml. of 85% strength phosphoric acid are now added, the temperature is raised to 40° C., and the suspension is stirred for 30 minutes at this temperature. The suspension is now stirred for one hour at 60° C. and is then cooled to 20° C. The suspension is adjusted to a pH value of 8.5 with 24% strength ammonia. The particle size of these capsules is also 1μ. The capsules are practically gas-tight and can be isolated as a powder.

The aminoplast precondensate is manufactured by stirring together for 30 minutes at 60° C.:

(a) 0.50 g. of melamine, 3.0 g. of thiourea, 10.5 g. of formaldehyde (37%) or
(b) 0.73 g. of melamine, 2.17 g. of thiourea, 11.1 g. of formaldehyde (37%)

EXAMPLE 4

(4.1) Manufacture of the primary emulsion 30.0 g. of reactive tenside according to instruction V are dissolved in 30 ml. of water and 0.5 ml. of 85% strength phosphoric acid. 100.0 g. of dyestuff solution, consisting of 3.6 g. of crystal violet-lactone, 2.4 g. of benzoyl-leucomethylene blue, 97.0 g. of Aroclor and 97 g. of paraffin oil are now emulsified with the reactive tenside solution using a fast stirrer. The emulsion is now mixed with 100 ml. of water and 2.5 ml. of 85% strength phosphoric acid.

(4.2) Curing of the primary emulsion

The primary emulsion is allowed to stand for 2 hours at room temperature and for 1½ hours at 60° C. During the curing a further 100 ml. of water are added. At the end, the pH value is adjusted to 6.0 using 24% strength ammonia.

(4.3) Manufacture of the secondary suspension 50.0 g. of the primary capsule emulsion from (4.2) are diluted with 30 ml. of water and a solution of 10 ml. of water and 10.0 g. of aminoplast precondensate (manufactured by stirring 15.1 g. of melamine and 29.25 g. of 37% strength formaldehyde at 60° C. for 30 minutes) are now added, whilst stirring. The suspension is stirred at room temperature for 30 minutes.

(4.4) Strengthening of the primary capsules 0.5 ml. of 85% strength phosphoric acid is added, the temperature is raised to 40° C., and the mixture is stirred for one hour at this temperature and for a further hour at 60° C. The suspension is cooled to 20° C. and is adjusted to a pH value of 9.0 with 24% strength ammonia. The particle size of the capsules is about 1$\mu$.

EXAMPLE 5

50.0 g. of the primary capsule suspension according to (1.2) are warmed to 40° C., and 30 ml. of water and 0.5 ml. of 85% strength phosphoric acid are added. A solution of 10 ml. of water and 10.0 g. of aminoplast precondensate (a) are now added dropwise and the mixture is stirred for 30 minutes at 40° C. A solution of 10 ml. of water and 10.0 g. of aminoplast precondensate (b) is then added dropwise and the mixture is stirred for 30 minutes at 40° C. and for one hour at 60° C. The suspension is now cooled to room temperature and the pH value is adjusted to 9.0 with 24% strength ammonia. The particle size of the capsules is about 1$\mu$.

Manufacture of the aminoplast precondensates (a) 45.0 g. of urea and 91.0 g. of 37% strength formaldehyde are stirred at a pH value of 7.9 to 8.0 for one hour at 80 to 85° C.

(b) 15.0 g. of urea, 81.0 g. of 37% strength formaldehyde and 5 ml. of 20% strength triethanolamine are stirred for 30 minutes at 60° C.

EXAMPLE 6

180 g. of a 40% strength solution of an adhesive of acrylic acid n-butyl ester, vinyl acetate and acrylic acid, in acetic acid ethyl ester, are mixed with 70 g. of tricresyl phosphate and are emulsified by means of a fast stirrer in a solution of 100 g. of 50% strength reactive tenside, according to instruction I, in 150 g. of distilled water. The emulsion is then diluted with 500 g. of water. The emulsion contains particles having a diameter of approximately 1$\mu$. The emulsion is freed of ethyl acetate by evaporation in vacuo, and is then adjusted to a weight of 1100 g. with distilled water. On adding 10 g. of 85% strength phosphoric acid in 140 g. of water, the pH value of the emulsion falls to 2.0 to 2.5. The emulsion is warmed to 35° C. and is kept for 18 hours at this temperature, whilst being gently agitated. A solution of 17.5 g. of urea in 35 g. of 37% strength formaldehyde and 197.5 g. of distilled water is now added to the primary capsule composition formed, and the mixture is stirred for a further 30 minutes. The secondary capsule composition which is strengthened in this way is neutralised by adding ammonia. It is applied to paper, and a smooth, non-tacky surface is obtained. However, if the coated paper is pressed against a substrate, the capsules burst and immediately an intensive adhesive effect takes place. The capsules consist of about 88% adhesive and 12% of resin coating.

EXAMPLE 7

30 g. of a styrene-butadiene copolymer is dissolved in 70 g. of toluene and 44 g. of dioctyl phthalate and 6 parts of Sudan black G are added to the solution. The resulting viscous dyestuff solution is emulsified in a solution of 110 g. of 50% strength reactive tenside according to instruction V and 80 g. of water, which has been adjusted to a pH value of 5.5 to 6.0 by adding 85% strength phosphoric acid. The emulsion which is produced by means of a fast stirrer is diluted with 450 g. of distilled water and is adjusted to a pH value of 2.0 by further addition of 85% strength phosphoric acid. The emulsion is warmed gradually, whilst stirring, at 60 to 65° C. and kept for 1½ hours at this temperature, whereupon the tenside is "cured." The emulsion is cooled to 20° C. and a further 1600 g. of water and 40 g. of a solution which has been prepared by dissolving 13.8 g. of melamine in 26.2 g. of 37% strength formaldehyde at 60° C., are added. The mixture is now stirred slowly for 3 hours, during which time the temperature should rise from 20° C. up to 60° C. Finally, the emulsion is cooled to 20° C., the capsule composition is filtered off on a suction filter, and the filter cake is then dispersed in such an amount of 3% strength polyvinyl alcohol solution that 1000 g. of a thin paste are formed. When this paste is applied to paper a coating is obtained which is darkly coloured but is entirely resistant to rubbing, and which produces a black carbon paper effect on any other paper.

EXAMPLE 8

100 g. of the pigment dyestuff from diazotised 1-amino-2-methyl - 4 - chlorobenzene, coupled with 2 - hydroxy-naphthalene-3-carboxylic acid - 2' - methyl - 4' - chlorophenylamide, are so finely distributed, by means of a ball mill, in 400 g. of a 10% strength solution of the reactive tenside according to instruction II, that the dispersion passes through filter paper after having been diluted with water to 1250 g. Such an amount of phosphoric acid or formic acid is added to the diluted pigment suspension that its pH value falls to 2.5. The suspension is allowed to stand for 2 hours at room temperature and is warmed, whilst stirring, to 60° C. and kept at this temperature for 2 hours. The suspension is now cooled to 20° C. and a solution of 22.5 g. of melamine in 56 g. of 37% strength formaldehyde and 171.5 g. of water is added, and the pH value which, as a result, has risen to 5.0, is re-adjusted to a value of 4.0 by adding acid. The suspension is heated to 60° C., whilst stirring carefully, and kept for 3 hours at this temperature. The encapsulated pigment suspension can be neutralised with ammonia before it is filtered off on a suction filter, washed and dried. About 140 g. of fine-grained, strongly coloured pigment powder are obtained which has, compared with the crude pigment, a distinctly improved fastness to oil (insolubility in organic solvents). A similar result is obtained if the reactive tenside III is empolyed instead of the reactive tenside II.

EXAMPLE 9

30.0 g. of the reactive tenside according to instruction IV (80 to 85% strength) are dissolved in 143.0 g. of water and 3.0 g. of glacial acetic acid. The aqueous solution is emulsified with 2000 g. of 3% strength dyestuff solution (manufactured from 36.0 g. of Crystal Violet lactone, 24.0 g. of Benzoylmethylene Blue, 970.0 g. of Aroclor and 970.0 g. of paraffin oil). During the emulsification the temperature must not be allowed to rise above 25° C.

400 ml. of water and 10.1 g. of 85% strength phosphoric acid are now added to the emulsion. The emulsion is allowed to stand for 2 hours at room temperature and is then stirred for 1½ hours at 60° C. At the end, the pH value is adjusted to 6.0 with 24% strength ammonia, and the suspension is diluted with 480 ml. of water.

Manufacture of the aminoplast precondensate 54.6 g. of melamine and 105.0 g. of formaldehyde (37% strength) are stirred for 30 minutes at 60° C. The clear solution is now diluted with 160 ml. of water.

The condensate solution is now added dropwise, over the course of 10 minutes, to the primary suspension, and the suspension is stirred for 30 minutes at room temperature and acidified with 8 ml. of 85% strength phosphoric acid. The suspension is stirred for 30 minutes at 40° C., and for one hour at 60° C. The suspension is now cooled to room temperature and adjusted to a pH value of 9.0 with 24% strength ammonia.

The suspension is filtered off and the residue is dried overnight in a vacuum drying cabinet at 65° C. Yield: 267.8 g. of capsule powder, from which it follows that: 200.0 g. of dyestuff solution=74.7%; 67.8 g. of capsule composition=25.3%.

EXAMPLE 10

A coating composition having the following composition is prepared using the capsules manufactured according to Example 1.

1000 g. of capsule composiion accotrding to Example 1
60 g. of degraded starch (as binder)
200 g. of water
10 g. of sodium carboxymethylcellulose (thickener)

The viscosity of this coating composition is 150 centipoise.

Cellulose paper is now coated with this composition using a laboratory coating machine, the weight applied being 6 g./m.$^2$.

A pressure-sensitive paper having good storage stability is obtained for use in the so-called "Chemical Transfer" copying process, and copies can be obtained on a reception paper coated with a kaolin which reacts acid, which show sharp script edges which are not blurred or smudged. Even after storage at 110° C. for more than 60 hours, the quality of the copy is not substantially influenced. Pressure-sensitive paper of good quality for use in the so-called Chemical Self-Contained Process can be manufactured using the same coating composition.

Capsules according to Example 5 can also be used equally successfully.

EXAMPLE 11

(a) 15 g. of the reactive tenside according to instruction IV are dissolved in 72 g. of water and 1.5 g. of glacial acetic acid. The aqueous solution is emulsified with a solution of 15 g. of 2,4,4'-trichloro-2'-hydroxydiphenyl ether in 85 g. of Archlor. The emulsion is diluted with 200 ml. of water and acidified with 3 ml. of phosphoric acid (85% strength). The emulsion is allowed to stand for 2 hours at room temperature and is subsequently stirred for 2 hours at 60° C At the end, the pH value is adjusted to 6.0 with 24% strength ammonia.

(b) 100 g. of the above primary suspension are diluted with 100 ml. of water and a solution of 20 g. of the aminoplast precondensate according to (1.3) in 60 ml. of water are added at room temperature, whilst stirring. The suspension is stirred for half an hour at room temperature and is adjusted to a pH value of 4.6 by adding 0.5 ml. of phosphoric acid (85% strength). The reaction is completed by stirring the reaction mixture for one hour at 40° C. and for a further hour at 60° C. The capsule suspension is then cooled to room temperature and adjusted to a pH value of 7 with concentrated ammonia. The capsule composition is obtained by filtering the suspension, and is dried in a vacuum cabinet at 60° C.

A solution of 5 g. of hexachlorophene in 95 g. of Arochlor can also be encapsulated under the same conditions.

EXAMPLE 12

(a) 30 g. of the reactive tenside according to instruction IV are dissolved in 160 g. of water and 1.5 g. of glacial acetic acid. The aqueous solution is emulsified with 30 g. of tri-n-butyl phosphate. The emulsion is diluted with 350 ml. of water and adjusted to a pH value of 3.1 with a solution of 6 ml. of concentrated phosphoric acid in 50 ml. of water. The emulsion is subsequently stirred for 1½ hours at room temperature, then for 1½ hours at 40° C., and finally for 2 hours at 60° C. The emulsion is then cooled to about 25° C. and adjusted to a pH value of 6.0 with 12 ml. of concentrated ammonia.

(b) 7 g. of the aminoplast precondensate according to (1.3), in 10 ml. of water, are added to 200 g. of the primary suspension prepared according to (a), over the course of 5 minutes at room temperature, and whilst stirring. The mixture is subsequently stirred for half an hour at room temperature, is then adjusted to a pH value of 3.4 with 3.4 ml. of concentrated phosphoric acid (85% strength), and is then stirred for one hour at 40° C. and for 2 hours at 60° C. The reaction mixture is then cooled to about 25 to 30° C., and adjusted to a pH value of 8.0 with 12.6 ml. of concentrated ammonia.

The capsule composition is obtained by filtering the suspension, and is dried in a vacuum cabinet at 60° C.

A solution of 0.9 g. of crystal violet lactone in 291 g. of tri-n-butyl phosphate, or a solvent mixture of trichloroethyl phosphate and trichlorobenzene can also be encapsulated under the same conditions.

EXAMPLE 13

(a) 25 g. of the reactive tenside according to instruction IV are dissolved in 125 g. of water and 2.5 g. of glacial acetic acid. The aqueous solution is emulsified with 100 g. of tris-(2,3-dibromopropyl)-phosphate. The emulsion is diluted with 500 ml. of water, then stirred for half an hour at room temperature, and adjusted to a pH value of 3.2 with 10 ml. of concentrated phosphoric acid (85% strength). The emulsion is subsequently stirred for ½ hour at 25° C., for ¾ hour at 40° C. and for 2 hours at 60° C. After cooling to 25° C., the suspension which is formed is adjusted to a pH value of 6.0 with 18.0 ml. of concentrated ammonia.

(b) 800 g. of the primary suspension manufactured according to (a) are diluted with 100 ml. of water, and 100 g. of the aminoplast precondensate according to (1.3), in 100 ml. of water, are added over the course of 10 minutes at room temperature, and whilst stirring.

The suspension is stirred for ½ hour at room temperature and is adjusted to a pH value of 3.0 with concentrated phosphoric acid. The suspension is subsequently stirred for ½ hour at 25° C., for 1 hour at 40° C. and for a further hour at 60° C. After cooling the suspension to 25° C., the suspension is adjusted to a pH value of 6.0 with concentrated ammonia. The capsule composition is obtained by filtering the suspension and is dried in a vacuum cabinet at 60° C.

EXAMPLE 14

100 g. of the reactive tenside according to instruction I are diluted with 100 g. of water and 260 g. of commercial petroleum are emulsified therein using a fast stirrer. The resulting emulsion is diluted further with water to 2500 g. The diameter of the petroleum droplets is at most 1µ. The pH value of the emulsion is adjusted to 3.5 by adding 85% strength $H_3PO_4$ and the emulsion is heated for 2 hours at 60° C., and is not stirred or is only gently stirred. A mixture of 33 g. of urea and 87.5 g. of 37% strength formaldehyde is subsequently added, and the pH value is adjusted to 3.0 by further addition of acid, and the emulsion is stirred for about 4 to 6 hours at 60° C. The capsule composition formed is filtered off on a suction filter and is washed with distilled water. No free petroleum can be detected, either in the filtrate or in the wash water, and the encapsulation is therefore practically complete. The capsule composition is then dried at normal temperature or slightly elevated temperature, for example at 60° C. a solid, colourless powder is obtained, which contains over 80% of petroleum and can be used, for example, as a solid fuel.

EXAMPLE 15

100 g. of reactive surface-active agent according to instruction I are diluted with 100 g. of water and 260 g. of commercially available petroleum are finely emulsified therein. The resulting emulsion is diluted with water to 2,500 g. The diluted emulsion is then acidified adding 85% strength phosphoric acid and a mixture of 33 g. of urea and 87.5 g. of 37% strength formaldehyde is immediately added. The subsequent encapsulation process is preferably carried out at a slightly elevated temperature, for example at 60° C., in the course of which the emulsion is left to stand quietly or is lightly stirred to avoid a surface skin forming. At a pH value of 3.0 to 4.0 the encapsulation takes 3 to 6 hours. The capsule mass formed is filtered off on a suction filter and is rinsed with distilled water. The encapsulation has taken place practically completely since free petroleum is not detectable either in the filtrate or in the wash water. After the capsule composition has been dried at ordinary or slightly elevated temperature, for example at 60° C., a solid, colourless powder is obtained which contains over 80% of petroleum and can be used as a solid fuel.

Instead of the reactive surface-active agent according to instruction I, a reactive surface-active agent according to instructions III to V can also be used.

EXAMPLE 16

50 g. of emulsifier according to instruction V are diluted with 70 g. of water and 130 g. of dibutyl phthalate are emulsified therein, whilst stirring. The resulting emulsion is mixed with 1,000 g. of water; the pH value is 7.9. A solution of 33 g. of melamine and 63 g. of formaldehyde (37% strength) in 104 g. of water is then added to the diluted emulsion and the reaction mixture is warmed to 60° C. after having first established a pH value of 3.0 by means of sulphuric, phosphoric or hydrochloric acid. The emulsion is then left to stand for 5 to 6 hours at this temperature without stirring or with only moderate stirring.

Thereafter the mixture is cooled to room temperature and the capsule composition formed is filtered off and well rinsed with water. The filtrate and the wash water are clear and do not contain any dibutyl phthalate.

The filter cake is dried at room temperature or in a drying cabinet at 60° C. The resulting soft powder can be used as a lubricant.

EXAMPLE 17

50 g. of emulsifier according to instruction I are diluted with 25 g. of water and a solution of 3.6 g. of crystal violet lactone, 2.4 g. of benzoyl-leuco-methylene blue, 47 g. of Arochlor and 47 g. of paraffin oil is emulsified therein, whilst stirring. The resulting emulsion is diluted with 1075 g. of water; the pH value is 8.7.

A solution of 33 g. of melamine and 63 g. of formaldehyde (37% strength) in 104 g. of water is then added to the diluted emulsion and the reaction mixture is warmed to 60° C. after having first established a pH value of 3.0 with sulphuric, phosphoric or hydrochloric acid. The emulsion is then left to stand for 5 to 6 hours at this temperature without stirring or with only moderate stirring.

Thereafter the mixture is cooled to room temperature and the capsule composition formed is filtered off and well rinsed with water. The filtrate and wash water are completely clear and do not contain any dystuff precursor.

228 parts of the capsule conposition are dispersed in 278 parts of water and 40 parts of a 1% strength methylcellulose solution. This dispersion is applied to paper and dried. A good copying effect is obtained on CF-paper.

EXAMPLE 18

50 g. of emulsifier according to instruction IV are diluted with 245 g. of water and 130 g. of paraffin oil (coloured with Fat Red 7B, 1.5% strength) and 5 g. of glacial acetic acid are emulsified therein, whilst stirring. The resulting emulsion is diluted with 1570 g. of water; the pH value is 4.8.

33 g. of urea and 87.5 g. of formaldehyde (37% strength) are dissolved at 30 to 40° C., the solution is adjusted to a pH value of 8.0 with triethanolamine and condensation is carried out for one hour at 70 to 80° C. 79.5% g. of water are added to the reaction product. This resin-precondensate preparation is added to the diluted emulsion, a pH value of 3.0 is established with phosphoric acid, and the reaction mixture is then left to stand for 3 hours at 60° C. After cooling to room temperature, the capsule compsition formed is filtered off and rinsed with water. The filtrate and wash water are clear and colourless and do not contain any paraffin oil.

The capsule composition is dispersed with a little water and the dispersion is then applied to paper. A good, non-smudging red copying effect is obtained.

EXAMPLE 19

A pigment dispersion is produced on a microsol mill from 40 g. of the azo pigment from diazotised 1-amino-2-methyl-4-chlorobenzene and 2-hydroxynaphthalene-3-carboxylic acid 2'-methyl-4'-chlorophenylamide, and 160 g. of a 10% strength aqueous preparation of the emulsifier III, and the dispersion is subsequently diluted with 1,000 g. of water. The following resin precondensate solution is added to this pigment dispersion.

60 g. of urea (1 mol) and 120 g. of formaldehyde (37% strength) are condensed for one hour at 70 to 80° C. at a pH value of 8.0 (triethanolamine) and after cooling the mixture is adjusted to 250 G. with distilled water.

The mixture of pigment dispersion and resin precondensate has a pH value of 8.2. A pH value of 2.5 is established by adding sulphuric, phosphoric or hydrochloric acid and the mixture is reacted for 3 hours at 60° C., whilst stirring gently. After cooling to room temperature, the mixture is neutralised with ammonia and the capsule composition formed is then filtered off and well rinsed. The filtrate and the wash water are clear and colourless.

The pigment-capsule preparation is dried in a drying cabinet at 100° C. As a result of the encapsulation the fastness of the pigment to oil is considerably increased relative to the capsule pigment. A sample of the pigment-capsule preparation, introduced into perchloroethylene, leads to no colouration of the solvent.

We claim:
1. A process for encapsulating a substance which is finely dispersed in a liquid, by means of tensides, which comprises
   (1) dispersing the substance to be encapsulated in the presence of a reactive tenside, the tenside being in aminoplast precondensate carrying methylol groups containing
      (a) the radical of a monohydroxy compound containing at least 4 carbon atoms and
      ($b_1$) the radical of an alkanolamine containing 2 to 6 carbon atoms, or
      ($b_2$) the radical of a polyethylene glycol of the formula $HO-(CH_2-CH_2-O)_n-H$ where $n$ is an integer from 2 to 115 or
      ($b_3$) the radical of an alcohol of the formula $H-(OCH_2-CH_2-CH_2)_m-OH$ where $m$ is an integer from 1 to 25, containing $Me-O_3S-$ groups joined to carbon atoms, wherein Me is an alkali metal atoms, or
      ($b_4$) the radical of an aliphatic hydroxy-carboxylic acid which is joined by means of the hydroxyl group to the aminoplast precondensate, or (b₅) the radical of an aliphatic hydroxy-carboxylic acid and the radical of an alkanolamine containing 2 to 6 carbon atoms (2) converting the reactive tenside in the dispersion into the irreversible insoluble state with the formation of a primary capsule suspension, (3) mixing this suspension with a solution of an aminoplast precondensate of low surface activity selected from methylol-melamines and methylolureas, whose methylol groups are unetherified or etherified with a monoalcohol containing at most 3 carbon atoms, and (4) converting these aminoplast precondensates in the suspension to the irreversible, insoluble state, with the formation of a secondary capsule suspension.

2. Process according to claim 1 wherein an etherified aminoplast precondensate containing methylol groups, the methylol groups of which are partially etherified with monohydroxy compounds which contain 4 to 22 carbon atoms, and partially with aliphatic hydroxycarboxylic acids which possess 2 to 4 carbon atoms, and partially with an alkanolamine which possesses 2 to 6 carbon atoms, is employed as the reactive tenside.

3. Process according to claim 1, wherein etherified methylol-ureas or etherified methylol-melamines, the methylol groups of which are partially etherified with alkanols which contain 4 to 22 carbon atoms, and partially with saturated hydroxyalkanecarboxylic acids which possess 2 to 4 carbon atoms, and partially with ethanolamine, diethanolamine or triethanolamine, are employed as the reactive tenside.

4. Process according to claim 1 wherein an aminoplast precondensate containing etherified methylol groups, the methylol groups of which are partially etherified with hydroxy compounds of the formula

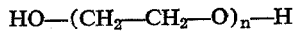

wherein $n$ denotes an integer from 2 to 115, and partially etherified with a monoalcohol having 4 to 7 carbon atoms, is employed as the reactive tenside.

5. Process according to claim 1, wherein curable ethers of methylol-ureas or methylol-melamines, the methylol groups of which are etherified with alkanols which contain 4 to 7 carbon atoms and with polyethylene glycols having an average molecular weight of 1000 to 5000, are employed as the reactive tenside.

6. Process according to claim 1, wherein aminoplast precondensates containing etherified methylol groups, the methylol groups of which are partially reacted with monohydroxy compounds containing at least 4 carbon atoms, and partially with alcohols containing at least 2 hydroxyl group and which contain Me—O₃S groups, wherein Me denotes an alkali metal atom, joined to carbon atoms, are employed as the reactive tenside.

7. Process according to claim 1, wherein etherified methylol-ureas or etherified methylol-melamines, the methylol groups of which are partially etherified with alkanols which contain 4 to 18 carbon atoms and partially with alcohols of the formula

H—(O—CH₂—CH₂)ₘ—OH wherein $m$ is an integer having a value of at most 25, and which contain Me—O₃S groups, wherein Me denotes an alkali metal atom, joined to carbon atoms, are employed as the reactive tenside.

8. Process according to claim 1, wherein an etherified aminoplast precondensate containing methylol groups, the methylol groups of which are partially etherified with monohydroxy compounds which contain 4 to 22 carbon atoms and, partially with aliphatic hydroxycarboxylic acids which possess 2 to 4 carbon atoms, is employed as the reactive tenside.

9. Process according to claim 1, wherein etherified methylol-ureas or etherified methylol-melamines, the methylol groups of which are partially etherified with alkanols which contain 4 to 22 carbon atoms and, partially with saturated hydroxyalkanecarboxylic acids which possess 2 to 4 carbon atoms, are employed as the reactive tenside.

10. Process according to claim 1, wherein an aminoplast precondensate, the methylol groups of which are partially reacted with an alkanol or a fatty acid, each of which contains at least 4 carbon atoms, and partially with an alkanolamine which possesses 2 to 6 carbon atoms, is employed as the reactive tenside.

11. Process according to claim 1, wherein a methylol-melamine, the methylol groups of which are partially etherified with an alkanol which possesses 4 to 22 carbon atoms and partially with ethanol-, diethanol- or triethanol-amine, is employed as the reactive tenside.

12. Process according to claim 1, wherein a di- to hexamethylol-melamine is employed as the aminoplast precondensate of low surface activity.

13. The capsule compositions obtainable according to claim 1.

14. A process for encapsulating a substance which is finely dispersed in a liquid, by means of tensides, which comprises (1) dispersing the substance to be encapsulated in the presence of a reactive tenside, the tenside being an aminoplast precondensate carrying methylol groups containing (a) the radical of a monohydroxy compound containing at least 4 carbon atoms and (b₁) the radical of an alkanolamine containing 2 to 6 carbon atoms, or (b₂) the radical of a polyethylene glycol of the formula

HO—(CH₂CH₂—O)ₙ—H, where $n$ is an integer from 2 to 115 or (b₃) the radical of an alcohol of the formula

H—(OCH₂CH₂CH₂)ₘ—OH where $m$ is an integer from 1 to 25, containing MeO₃S groups joined to carbon atoms, wherein M is an alkali atom, or (b₄) the radical of an aliphatic hydroxycarboxylic acid which is joined by means of the hydroxyl group to the aminoplast precondensate, or (b₅) the radical of an aliphatic hydroxycarboxylic acid and the radical of an alkanolamine containing 2 to 6 carbon atoms, (2) mixing this suspension with a solution of an aminoplast precondensate of low surface activity selected from methylol-melamines and methylol-ureas, whose methylol groups are unetherified or etherified with a monoalcohol containing at most 3 carbon atoms and (3) converting the reactive tensides and the aminoplast precondensates of low surface activity in the suspension to the irreversible insoluble state, with the formation of a suspension of capsules.

15. The capsule compositions obtainable according to claim 14.

References Cited
UNITED STATES PATENTS

| | | | |
|---|---|---|---|
| 3,594,328 | 7/1971 | Schibler | 252—316 |
| 3,429,827 | 2/1969 | Ruus | 252—316 |
| 3,074,845 | 1/1963 | Geary | 424—32 X |

RICHARD D. LOVERING, Primary Examiner

U.S. Cl. X.R.

8—79; 44—7 R; 71—64 F; 106—308 N; 117—36.2, 36.8, 72, 100 A, 100 B; 252—10, 364; 260—30.6 R, 31.2 R, 31.2 N; 264—4; 424—32

UNITED STATES PATENT OFFICE
CERTIFICATE OF CORRECTION

Patent No. 3,778,383　　　　Dated December 11, 1973

Inventor(s) Luzius Schibler and Melvin Harris

It is certified that error appears in the above-identified patent and that said Letters Patent are hereby corrected as shown below:

CLAIM 1, Column 16, line 61, change "in" to -- an --.

CLAIM 1, Column 16, line 74, change "atoms" to -- atom --.

Signed and sealed this 1st day of October 1974.

(SEAL)
Attest:

McCOY M. GIBSON JR.
Attesting Officer

C. MARSHALL DANN
Commissioner of Patents